US006719323B2

United States Patent
Kai et al.

(10) Patent No.: US 6,719,323 B2
(45) Date of Patent: Apr. 13, 2004

(54) AIR BAG APPARATUS AND STEERING WHEEL

(75) Inventors: Takeshi Kai, Wako (JP); Morimasa Asai, Fuji (JP); Masami Tonooka, Fuji (JP); Katsuhiro Tokita, Fuji (JP)

(73) Assignees: Honda Giken Kogyo Kabushiki Kaisha, Tokyo (JP); Nihon Plast Co., Ltd., Shizuoka (JP)

( * ) Notice: Subject to any disclaimer, the term of this patent is extended or adjusted under 35 U.S.C. 154(b) by 47 days.

(21) Appl. No.: 10/133,692

(22) Filed: Apr. 26, 2002

(65) Prior Publication Data

US 2002/0113419 A1 Aug. 22, 2002

Related U.S. Application Data

(63) Continuation-in-part of application No. 09/633,402, filed on Aug. 7, 2000, now abandoned.

(30) Foreign Application Priority Data

Aug. 6, 1999 (JP) .......................................... 11-224655
Jun. 13, 2000 (JP) ....................................... 2000-177445

(51) Int. Cl.[7] .............................................. B60R 21/20
(52) U.S. Cl. ................................ 280/731; 200/61.54
(58) Field of Search ........................... 280/731, 728.3; 200/61.54, 61.55

(56) References Cited

U.S. PATENT DOCUMENTS 6,244,618 B1 * 6/2001 Yokota ..................... 280/728.3
6,257,615 B1 * 7/2001 Bohn et al. ................. 280/731

FOREIGN PATENT DOCUMENTS

| DE | 4016047 A1 | 11/1991 | | |
|---|---|---|---|---|
| DE | 29805210 U1 | 6/1998 | | |
| EP | 842826 A1 | * 5/1998 | ........... | B60R/21/20 |
| JP | 9-30425 A | 2/1997 | | |
| JP | 9-183350 A | 7/1997 | | |
| JP | 10-100832 A | 4/1998 | | |
| JP | 10119789 A | * 5/1998 | ........... | B62D/01/04 |
| JP | 2584091 Y2 | 8/1998 | | |
| JP | 10-297390 A | 11/1998 | | |
| JP | 2592826 Y2 | 1/1999 | | |
| JP | 11-297155 A | 10/1999 | | |

* cited by examiner

Primary Examiner—Peter C. English
(74) Attorney, Agent, or Firm—Dennis G. LaPointe; Mason Law, P.A.

(57) ABSTRACT

For improving horn switch operability, an air bag apparatus 4 supports the side wall 26b of the cover body 26 and is movable back and forth on the outer periphery of the surrounding wall 24 of the base plate 24. Hook 24h protrudes from the surrounding wall 24b and is locked onto lock receiving portion 26h of the side wall 26b, thereby regulating the moving range of the cover body 26. Bracket 35 is mounted on the under surface of the covering portion 26a and is positioned at each of the spokes 7. A movable first contact 36e, 136e is mounted on the bracket 35. A fixed contact support portion 31 is provided on the outer peripheral surface of the side wall 24b of the base plate 24 to protrude therefrom or support 131 in the shape of a pillar is provided integrally to protrude from the core metal 7a of the spoke 7. A fixed second contact 31d, 131d that is opposed to the movable contact 36e, 136e is provided to oppose the movable contact 36e, 136e.

22 Claims, 6 Drawing Sheets

AIR BAG APPARATUS AND STEERING WHEEL

RELATED APPLICATIONS

This application is a continuation-in-part of U.S. patent application Ser. No. 09/633,402, filed Aug. 7, 2000, abandoned.

BACKGROUND OF THE INVENTION

The present invention relates to an air bag apparatus provided with a switch and a steering wheel.

Such prior art automobile steering wheels typically include a switching device such as a horn switch, which is incorporated in an air bag apparatus installed on a boss (the center pad portion).

For example a switching device may be installed on a boss of a steering wheel body, and the air bag apparatus as a whole is supported elastically to be capable of moving back and forth by means of the switching device. However, since the weight of the air bag apparatus as a whole is supported by a spring installed in the switching device, it is necessary to make the spring stiffer, thus giving rise to a problem of making it difficult to improve the feel of operating the switching device.

Japanese Laid-open Patent Publication No. 10-297390 discloses an air bag apparatus including an inflator, a base plate whereon the inflator is mounted, a horn switch base of cylindrical shape which is secured on the base plate, and a cover body that also serves as a horn button and is slidably mounted on the horn switch base. The switching device is installed in a sliding portion between the side wall of the cover body and the horn switch base.

In this prior art apparatus, the weight that must be supported by the switching device is reduced and the feeling of operation can be improved, although the air bag apparatus requires a separate horn switch base. The device becomes complicated because the switching device is incorporated in the side wall of the cover body. It therefore becomes difficult to reduce the manufacturing cost and to make the air bag apparatus compact, thereby making it difficult to design the steering wheel with an improved appearance.

SUMMARY OF THE INVENTION

The present invention has been made in view of the points described above, and an object thereof is to provide an air bag apparatus and a steering wheel of such a design to include a switch that has a simple constitution, can be made with a reduced manufacturing cost and can be made small in size.

The air bag apparatus of the present invention comprises an air bag, an inflator that supplies a gas to the air bag, a base portion of a base body that is attached to a steering wheel body and has the air bag and the inflator mounted thereon, the base body having a surrounding wall formed to protrude in a closed or substantially closed shape on the front side of the base portion, a cover body consisting of a lid that covers the front side of the surrounding wall and a side wall that is formed to protrude downwardly along said surrounding wall, preferably in a closed or substantially closed shape, on the back side of the lid and is located on the outer peripheral side of the surrounding wall, and a switching device that is located on the outer peripheral side of the side wall and is provided with an urging means for urging the cover body away from the base portion, a first contact supported on the back side of the lid, and a second contact which opposes the back side of the first contact and is supported by at least one of the base body and the steering wheel body.

In this constitution, when a force is not applied to the front side of the cover body, the cover body is urged by the urging means of the switching device so that the first contact is held at a position away from the second contact. When the lid of the cover body is pressed against the urging force of the urging means, the first contact is forced via the lid to move and make contact with the second contact thereby to close the contacts. Since the switching device supports only the cover body, not the entire air bag apparatus, the urging force of the urging means can be reduced and the feeling of operation of the switching device can be improved. Moreover, since the switching device is operated by pressing directly on the lid, the feeling of operation of the switching device can be improved compared to such a constitution wherein the entire air bag and the side wall of the cover body are provided between the pressing portion and the switching device. Also because the switching device is located on the outer peripheral side of the side wall of the cover body, constitution of the cover body and the base body is simplified, the manufacturing cost can be reduced and the apparatus can be reduced in size.

In the air bag apparatus, the height of the surrounding wall of the base body is substantially equal to the total height of an air bag housing portion enclosing the air bag.

The air bag enclosed in the air bag housing portion is protected from the cover body, that moves back and forth when the switching device is pressed to operate, by providing the surrounding wall of the base body with a height that is substantially equal to the total height of the air bag housing portion.

The air bag apparatus is provided with a wrapping, which covers at least a part of the front side of the air bag enclosed in the air bag housing portion.

In this constitution, the air bag that is incorporated in a folded up condition can be maintained in a desired shape and kept stationary at a desired position, while the air bag incorporated in the air bag housing portion is protected from the cover body that moves back and forth when the switching device is pressed to operate.

In the air bag apparatus, the surrounding wall of the base body is formed integrally with the base portion.

In this constitution, the constitution is simplified to have a reduced number of component parts, so that the assembly operation is also simplified. The manufacturing cost is reduced, and the apparatus is also smaller in size.

In the air bag apparatus, an engagement portion is provided on one of the surrounding wall and the side wall, and a lock receiving portion engaging with and holding the engagement portion movably within a predetermined range in back and forth directions is provided on the other of the surrounding wall and the side wall.

In this constitution, the constitution is simplified with a reduced number of component parts, so that the assembly operation is also simplified. The manufacturing cost is reduced, and the apparatus is also smaller in size.

In the air bag apparatus, the lock receiving portion guides the engagement portion freely in such a direction as the contacts make contact with and depart from each other in a range of movement caused by normal operation of the switching device.

In this constitution, the feeling of operation of the switching device can be improved since contact between the cover body and the base body is restricted and the distance between the contacts is regulated by the switching device only during operation of the switching device.

The base body can be molded as a single body using a die by forming the base portion, the surrounding peripheral wall that is formed to protrude in a closed or substantially closed shape on the front side of the base portion and a support portion that is provided on the outer peripheral portion of the surrounding peripheral wall to oppose the back side of the lid and support the second contact.

In this constitution, the base body of a complicated structure can be molded integrally in a predetermined die. Wall thicknesses required for any position can be arbitrarily set, thereby rationalizing and optimizing the structure, thus making it possible to achieve a proper strength while reducing the total weight. Moreover, the base body can be formed integrally in a single process, thus making it unnecessary to construct the base body from a number of separate parts, thereby realizing a structure having fewer or no joints, resulting in a simplified process of manufacturing the base body and reduced manufacturing cost. Also it becomes possible to use a material that is highly workable in a plastic state, without any tedious joining processes.

In the air bag apparatus, the switching device has a bracket that holds the first contact and supports at least the outer peripheral side of the side wall.

In this constitution, since at least the outer peripheral side of the side wall is supported by the bracket that holds the first contact, the side wall of the cover body can be restricted from deforming without making the construction complicated. Since the bracket is located on the outer peripheral side of the surrounding wall and the side wall, the operations of assembly and inspection are made easier.

The steering wheel of the present invention comprises the steering wheel body serving as a member to be mounted and consisting of a boss mounted on a steering shaft, a wheel for operation and spokes that connect the boss and the wheel. The air bag apparatus provided with the switching device is installed on the spoke.

In this constitution, since the air bag apparatus is provided with a switching device having a good feeling when operated that is located on the spokes, the air bag apparatus can be smaller in size and a steering wheel of an improved appearance can be provided.

DETAILED DESCRIPTION OF THE PREFERRED EMBODIMENTS

Now an embodiment of the air bag apparatus and the steering wheel of the present invention will be described below with reference to the accompanying drawings.

Figure 1:
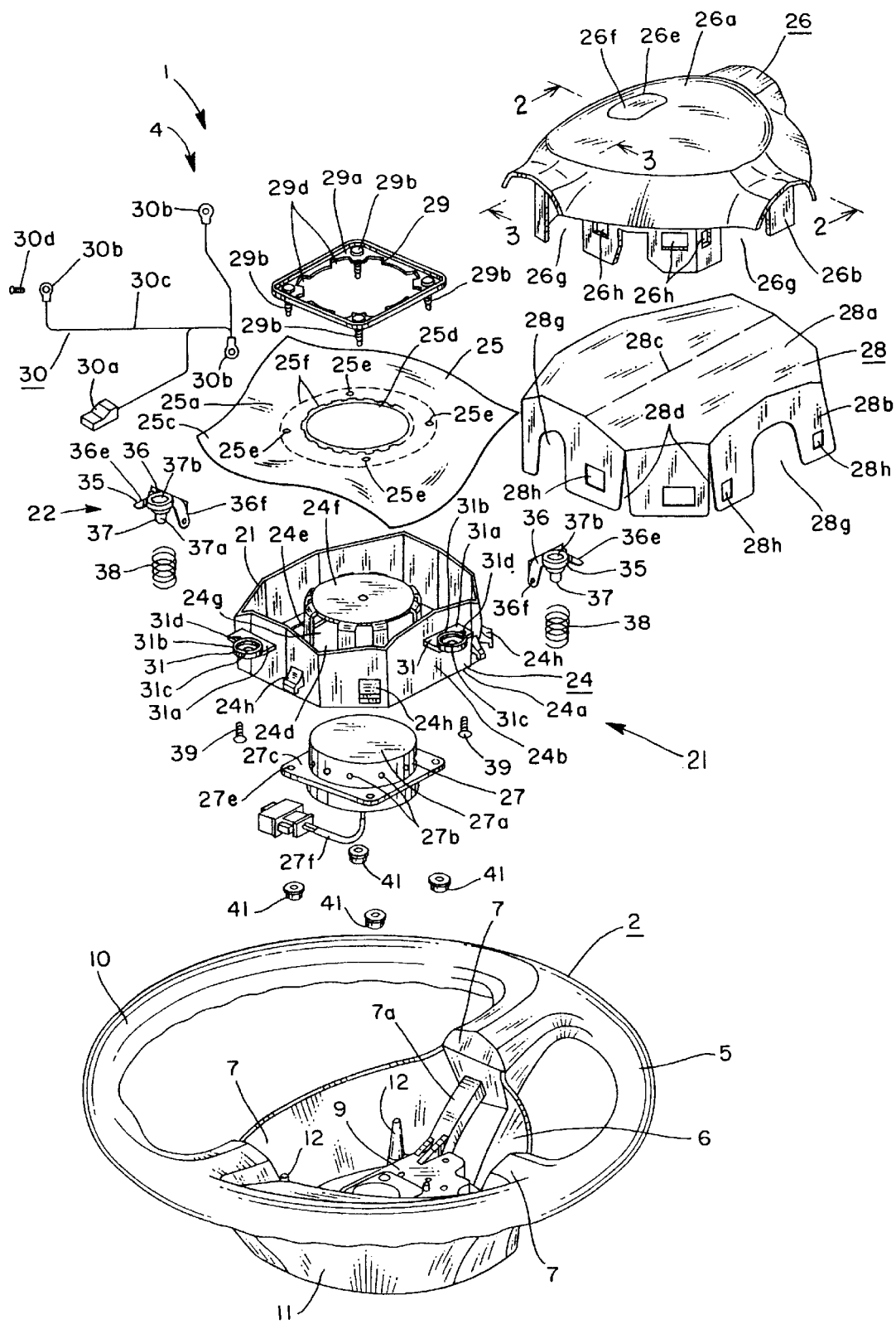
FIG. 1 is a sectional blown-up view showing a steering wheel provided with the air bag apparatus of the present invention.
Figure 2:
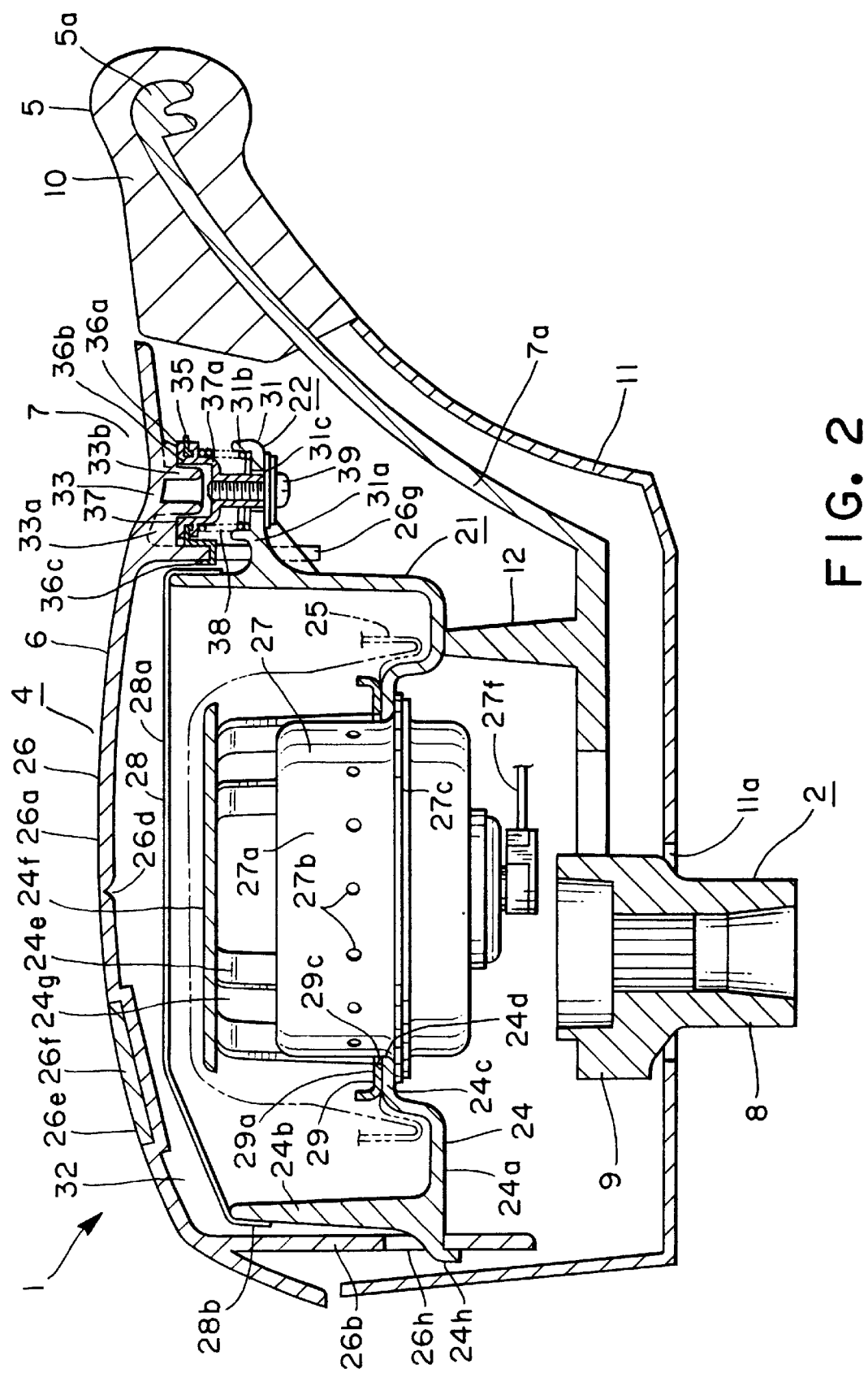
FIG. 2 is a sectional view along line 2—2 in FIG. 1.
Figure 3:
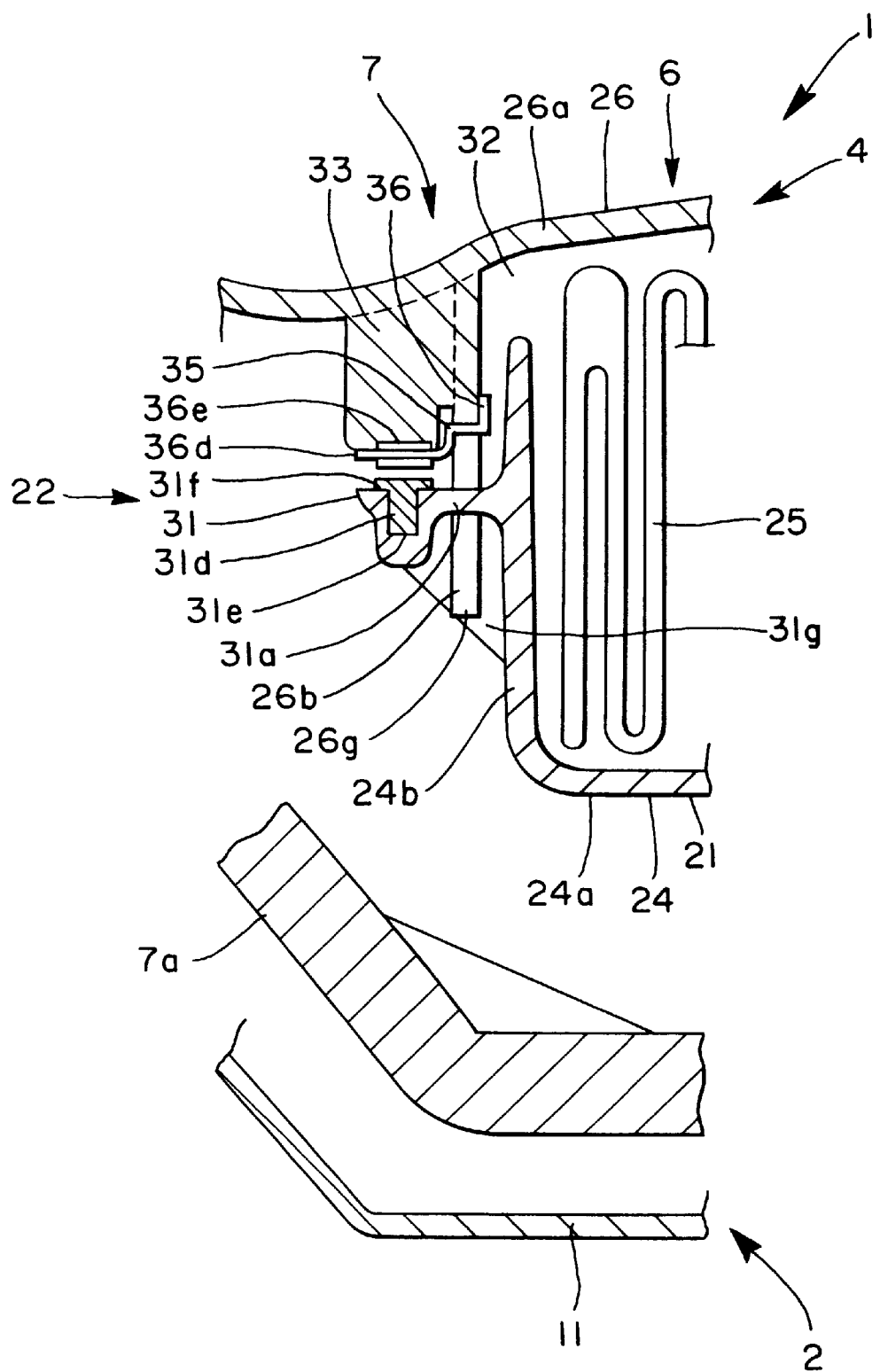
FIG. 3 is a sectional view along line 3—3 in FIG. 1.

In FIG. 1 through FIG. 3, reference numeral 1 denotes an automobile steering wheel, the steering wheel 1 comprising a steering wheel body 2 that serves as a member to be mounted, an air bag apparatus (air bag module) 4 attached on the passenger side of the steering wheel body 2 and other components. While the steering wheel 1 is normally used in the state of being inclined at a predetermined angle, a front side of the air bag apparatus 4, namely a passenger side thereof, will be referred to as an upper side and a back side of the air bag apparatus 4, namely a vehicle body side thereof, will be referred to as a lower side.

The steering wheel body 2 is constituted from a rim 5 that serves as a wheel having an annular ring shape and is also called a ring portion or grip. A boss section 6 is located inside of the rim 5, and a plurality of spokes 7 (three in the embodiment shown in FIG. 1) connect the rim 5 and the boss section 6. Provided below the boss section 6 is a boss 8 that has a substantially cylindrical shape and is fitted on a steering shaft (not illustrated), while the boss 8 has a boss plate 9, having such a shape as a plate or the like, adhered thereon by welding or another method or formed integrally therewith. A core metal 7a of each spoke 7 extends from the boss plate 9 and is adhered thereon by welding or another method, or is formed integrally therewith. Further a core metal 5a of the rim 5 is formed on the core metal 7a of each spoke 7 and is adhered thereon by welding or another method, or is formed integrally therewith. Formed on the outer peripheral portion of the core metal 5a of the rim 5 and on the outer peripheral portion of the rim 5 side part of the core metal 7a of each spoke 7 is a covering 10 made of a synthetic resin or the like. In this embodiment, the boss plate 9 and the core metals 5a, 7a are formed integrally by die casting of a magnesium alloy, while being covered by the covering 10 that is formed integrally from polyurethane foam.

Attached to the boss plate 9 is a lower cover (back cover) 11 made of a resin such as polypropylene fastened by means of screws or the like, to thereby cover the lower side of the boss section 6. The lower cover 11 has an opening 11a formed at the center thereof, to pass the boss 8 or the steering shaft therethrough. Further attached on the inside or at the lower side of the lower cover 11 is an electrical connection device for electrically connecting components on the vehicle body and steering wheel.

Support bosses 12 that are positioned at desired locations below the air bag apparatus 4 while making contact therewith are provided integrally to protrude upward from the boss plate 9. An air bag apparatus mounting portion that holds and fixes the air bag apparatus 4 is provided integrally or separately on the boss plate 9 or the core metal 7a of the spokes 7.

The air bag apparatus 4, also called the air bag module, has an air bag apparatus body 21 as shown in FIG. 1 through FIG. 4, and is also provided with horn switch devices 22 at a plurality of positions (three in the embodiment of the invention) on the outer peripheral side of the air bag apparatus body 21 integrally therewith.

The air bag apparatus body 21 is constituted from a base plate 24 serving as a base body, a bag-shaped air bag 25, a cover body 26 made of a resin that covers the air bag 25, an inflator (gas generator) 27 that discharges a gas, a wrapping 28 that covers the air bag 25 inside of the cover body 26, a retainer (retainer ring) 29 that secures the air bag 25 and the inflator 27 onto the base plate 24, an electrical terminal connection device 30 and other components.

The base plate 24 is formed integrally in the shape of a box opening at the top without a lid by molding by die casting thereof, for example, a magnesium alloy and comprises a base or substrate portion 24a that has a substantially polygonal shape, a surrounding wall 24b having the shape of a polygonal tube protruding upward from the peripheral portion of the substrate portion 24a on substantially the entire circumference thereof, and other components. The substrate portion 24a has a bulging portion 24c formed at the center thereof to rise upward, and a communicating hole 24d for the inflator 27 formed as a circular hole at the center of the bulging portion 24c, while bolt inserting holes (not illustrated) are formed at a plurality of positions (four in the embodiment of the invention) on the outer periphery of the inflator communicating hole 24d. Formed to surround the inflator communicating hole 24d is a swelling portion 24f having a cup shape with a plurality of pillars 24e to form spaces between the pillars 24e as gas passages 24g.

The inner surface of the surrounding wall 24b is made smooth and without protrusions to house the air bag. Provided on the outer surface of the surrounding wall 24b are hooks 24h formed integrally at predetermined intervals with tips thereof being directed downward. Shelf-like fixed contact support portions or members 31 serving as supports for the horn switch devices 22 are formed integrally at a plurality of positions (three protruding from the surrounding wall 24b in the embodiment of FIG. 1 where two are observable and the third is non-observable). Each of the fixed contact support portions 31 has a support plate 31a protruding horizontally from the surrounding wall 24b, an annular portion 31b provided on the distal end of the support plate 31a, a communicating hole 31c formed at the center of the annular portion 31b, and a fixed contact 31d serving as the second contact fastened integrally or separately on the support plate 31a on one side of the annular portion 31b. In the embodiment of the invention, the fixed contact 31d is made by inserting a rivet 31f made of brass into a recess 31e with pressure from above as shown in FIG. 3. Each of the fixed contact support portions 31 further has a support rib 31g integrally formed therewith for supporting the support plate 31a by connecting the back surface of the support plate 31a and the outer surface of the surrounding wall 24b.

While the air bag 25 is shown by drawing only the mounting portion 25a at the middle of the bottom thereof in FIG. 1, the air bag 25 is formed in a bag shape by superposing two circular base fabrics and sewing along the outer periphery thereof or otherwise joining them. Formed at the center of the bottom, namely at the center of the lower base fabric 25c, is a communicating hole 25d for the inflator 27 in the form of a circular hole where the inflator 27 and the swelling portion 24f of the base plate 24 are passed through, and four bolt holes 25e are formed along the outer periphery of the inflator communicating hole. Furthermore, a diskshaped reinforcement fabric (not illustrated) is placed around the inflator communicating hole 25d and is concentrically sewn with triple stitches 25f thereby increasing the strength.

The cover body 26 is also called the air bag cover and is formed integrally from a synthetic resin, for example, by injection molding of an elastomer. The cover body 26 has a covering or lid portion 26a that appears as the center pad of the steering wheel 1 by covering the boss 8 and portions of the spokes 7 of the steering wheel body 2, and the side wall 26b having the shape of a rectangular tube protruding from the back surface of the covering portion 26a downward. A portion surrounded by a side wall 26b, the covering portion 26a and the base plate 24 that is attached to the under side of the cover body 26 becomes the air bag housing portion 32 that houses the folded air bag 25. Formed on the back surface of the covering portion 26a while facing the air bag housing portion 32 is a tear line 26d that is a weak portion having a thin thickness formed substantially in the shape of a letter H where rupture takes place first, on the back surface of the covering portion 26a. Also formed on the front surface of the covering portion 26a is a recess 26e. A name plate 26f is made by wrapping a substrate made of nylon with an aluminum plate whereon printing is applied. The name plate 26f is secured in the recess 26e.

Formed on the side wall 26b of the cover body 26 are notches 26g that are directed toward spokes 7. Lock receiving portions 26h are rectangular communication holes which are formed at predetermined intervals between the notches 26g.

Figure 4:
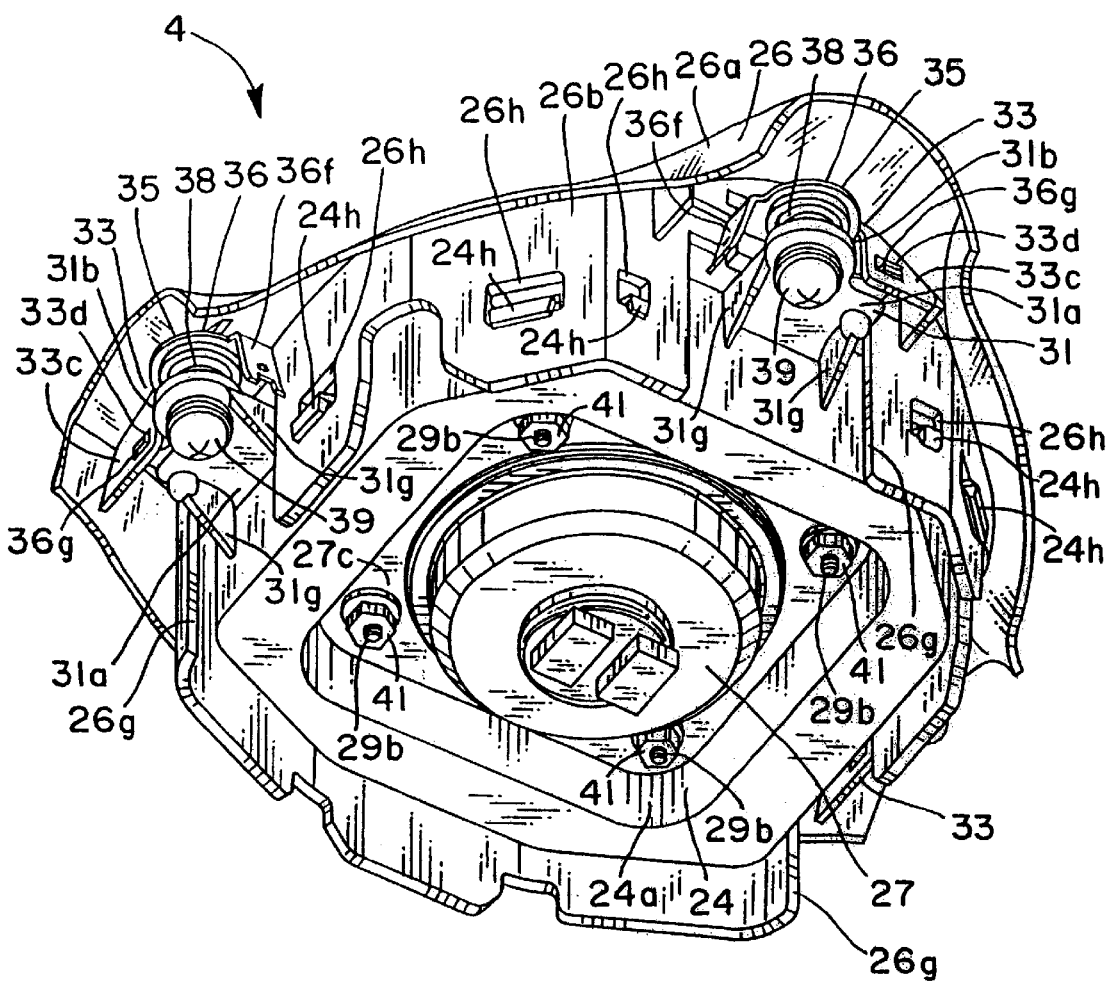
FIG. 4 is a perspective view of the air bag apparatus of the embodiment.
Figure 5:
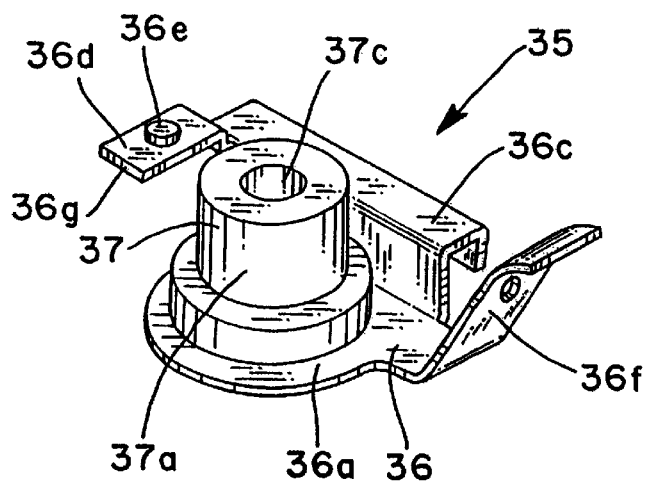
FIG. 5 is a perspective view of the bracket used in the present invention.

Further provided on the back surface of the covering portion 26a of the cover body 26 are movable contact support portions 33, that form part of the horn switch devices 22, which are located above the spokes 7 on the outer peripheral side of the side wall 26b. Each movable contact support portion 33 comprises a cylindrical boss 33b reinforced by ribs 33a as shown in FIG. 2, a locking rib 33c which extends in a longitudinal direction that crosses the longitudinal direction of the respective spoke 7 as shown in FIG. 4, and a locking hole 33d penetrating the locking rib 33c along the longitudinal direction of the respective spoke 7. A bracket 35 is attached to each of the movable contact support portions 33.

The air bag housing portion 32 is made in such a configuration so that the surrounding wall 24b of the base plate 24 which is substantially equal in height to the total height of the side wall 26b and the air bag 25 folded and housed in the air bag housing portion 32, does not touch the side wall 26b of the cover body 26.

Each bracket 35 is made by outsert molding (integrated in-mold) of an insulator portion 37 made of an insulating resin such as 6—6 nylon integrally formed on a plate 36 made of steel. The plate 36 has a plate base portion 36a having a substantially flat plate configuration, a hole 36b shown in FIG. 2 formed in the plate base portion 36a, a hook 36c formed by bending to have a cross section of substantially the shape of a letter C on one side of the plate base portion 36a, a step 36d provided to extend at a position a little lower than the plate base portion 36a, a movable contact 36e serving as the first contact that is fixed integrally or separately on the step 36d, a terminal mounting portion 36f provided to extend from the plate base portion 36a inclining downward, and an insertion piece 36g provided to extend from the step 36d. The insulator portion 37 has a spring receiving portion 37a having a cylindrical shape, a positioning portion 37b provided in a shape of a recess covering the hole 36b at an upper portion of the inside of the spring receiving portion 37a and a mounting receiving portion 37c provided at a lower portion of the inside of the spring receiving portion 37a formed therein.

Mounted on the spring receiving portion 37a is the upper end of a coil spring 38, that functions as an elastic urging means. A screw 39 that constitutes a support shaft serving as a mounting means is screwed into the mounting receiving portion 37c.

The terminal connection device 30 has a connector 30a, three ring-shaped crimp terminals 30b and lead wires 30c that connect the connector 30a and the crimp terminals 30b. Each of the crimp terminals 30b is connected electrically and mechanically to the terminal mounting portion 36f of one of the brackets 35 by a screw 30d or the like, while the connector 30a is connected electrically and mechanically to a connecting device that electrically connects the switch devices 22 to a horn device.

The inflator 27 has a substantially cylindrical inflator body (container) 27a filled with a propellant or the like inside thereof, while gas jet ports 27b are formed on the upper side portion of the inflator body 27a at predetermined intervals around the circumference. Formed on the outer peripheral side to protrude from a substantially middle portion in the direction of height of the inflator body 27a is a flange 27c with four bolt holes 27e formed in the flange 27c. Lead wires 27f and the like are lead through the bottom of the inflator body 27a to the outside, thereby supplying drive electric power. A protector formed integrally from a synthetic resin may also be fitted in the bottom of the inflator body 27a.

The wrapping 28 is for the purpose of covering the folded air bag 25 and holding the folded configuration thereof, and is formed in the shape of a bottomless box made of a nylon base fabric similar to the air bag 25, or paper impregnated with a resin, for example, Tyvek (product name). The wrapping 28 has a front portion 28a that covers the front side of the folded air bag 25 and the surrounding wall 28b, while a rupture line 28c consisting of intermittent perforations is formed in the front portion 28a. The surrounding wall 28b is formed discontinuously with slits 28d, while notches 28g that are directed toward the spokes 7 and communicate with the bottom end (similar to the side wall 26b of the cover body 26) are formed in the surrounding wall 28b. Lock receiving portions 28h that are rectangular communicating holes are formed at predetermined intervals between the notches 28g.

The retainer 29 has a retainer body 29a made of a metal in a rectangular shape on the outside and substantially circular inside, and the retainer body 29a has a plurality of bolt holes (not illustrated) and set bolts (stud bolts) 29b fixed thereto. A communicating hole 29c on the inner circumference of the retainer body 29a has substantially the same shape as the inflator communicating hole 24d of the base plate 24, while notches 29d corresponding to the plurality of pillars 24e are formed on the inner circumference of the retainer body 29a. Set bolts 29b are aligned with the bolt holes made in the base plate 24 or the like.

Now the process of assembling the air bag apparatus 4 will be described below.

First, the retainer 29 is inserted through the inflator communicating hole 25d into the air bag 25, and the set bolts 29b of the retainer 29 are inserted into the bolt holes 25e of the air bag 25 thereby to be exposed to the outside. The air bag 25 and the retainer 29 are folded up by means of an air bag folder. That is, the air bag 25 is positioned between two opposing tables and fastened onto one of the tables, for example the upper table, and the distance between the two tables is kept nearly equal to the height of the surrounding wall 24b of the base plate 24. In this condition, a plurality of (for example, four) vertical holding plates are moved to slide from the entire periphery of the air bag 25 from the outer peripheral direction toward the center, thereby to gather the air bag 25 into a wavy shape within a range of thicknesses regulated by the two tables, thus folding up the air bag 25. In the condition where the air bag is fixed on the circumference by the holding plates, the upper table is removed and the base plate 24 is placed over the folded air bag 25, thereby to house the air bag 25 in the base plate 24. Then the wrapping 28 is applied so that the communicating holes 28h are caught by the hooks 24h, thereby preventing the air bag 25 from deforming and expanding by the self-restoring force. The wrapping 28 may also be fastened onto the surrounding wall 24b of the base plate 24 by means of a double-sided adhesive tape or the like.

The hook 36c of the bracket 35 locks onto the edge of the notch 26g of the side wall 26b of the cover body 26, while the insertion piece 36g is inserted into the locking hole 33d of the movable contact support portion 33 of the cover body 26 in the direction toward the outer peripheral side, namely toward the rim 5, to lock therein thereby being assembled in the movable contact support portion 33 of the cover body 26. The cover body 26 made of a soft resin can be easily deformed and assembled with the bracket 35, when the inside of the side wall 26b is empty. Under this condition, the boss 33b is inserted in the positioning portion 37b of the bracket 35 and is thereby positioned.

In such a condition wherein one end of the coil spring 38 is fitted on the spring receiving portion 37a of the bracket 35, the cover body 26 is applied to cover the base plate 24 that houses the air bag 25, and the hooks 24h of the base plate 24 are hooked onto the lock receiving portions 26h of the cover body 26, thereby assembling the side wall 26b and the surrounding wall 24b in a socket and spigot joint configuration.

Further in this condition, the other end of the coil spring 38 is supported by the annular portion 31b of the fixed contact support portion of the base pate 24, and the screw 39 is inserted through the communicating hole 31c of the fixed contact support portion 31 and screwed into the mounting receiving portion 37c of the bracket 35. Then such a condition exists wherein the movable contact 36e of the bracket 35 and the fixed contact 31d of the base plate 24 oppose each other, and are insulated from each other with a space of a predetermined distance by the urging force of the coil spring 38.

With the cover body 26 combined with the base plate 24, the upper side portion of the inflator body 27a is inserted into the swelling portion 24f and, at the same time, the set bolts 29b of the retainer 29 that protrude from the bolt holes of the base plate 24 are inserted into the bolt holes of the inflator 27. Nuts 41 are screwed from the tips of the set bolts 29b and tightened, so that the air bag 25 and the base plate 24 are interposed and fastened between the flange 27c of the inflator 27 and the retainer body 29a of the retainer 29.

Furthermore, each crimp terminal 30b of the terminal connection device 30 is connected to the terminal mounting portion 36f of one of the brackets 35 by means of screws 30d or the like, thereby completing the air bag apparatus 4 that has the horn switch devices 22.

The air bag apparatus 4 is incorporated in the steering wheel body 2 by fastening the base plate 24 onto the boss plate 9 by means of screws or other means (not illustrated). In this condition, the movable contact 36e is connected via the connector 30a of the terminal connection device 30 to the connecting device that electrically connects between the vehicle body side and the steering wheel 1 side and is, through this connecting device, connected to a positive circuit of the horn device on the vehicle body side (not illustrated). The fixed contact 31d is connected to the vehicle body (ground) via, for example, the base plate 24, the boss 8 and the steering shaft.

In the air bag apparatus 4 of the steering wheel 1 that is assembled as described above, when the vehicle experiences a collision or the like, an inert gas such as nitrogen is quickly discharged by the inflator 27 into the air bag 25, thereby causing the air bag 25 that has been folded and contained to expand quickly. The pressure of expansion of the air bag 25 tears off the wrapping 28 along the rupture line 28c, while the cover body 26 tears off along the tear line 26d to open like doors and make an ejection aperture for the air bag 25. The air bag 25 is deployed through this ejection aperture and expands in front of the passenger, thereby protecting the passenger from the impact of collision.

When no force is applied to the cover body 26 of the air bag apparatus 4, the horn switches 22 push up the brackets 35 and the cover body 26 to an upper limit and hold them there by the urging force of respective coil springs 38. When the cover body 26 of the air bag 4 is pressed against the urging force of the coil springs 38, on the other hand, the cover body 26 is guided by the engagement portion between the lock receiving portions 26h of the cover body 26 and the hooks 24h of the base plate 24 to descend, so that the movable contact 36e makes contact with the fixed contact 31d to close the circuit thereby sounding the horn.

According to this embodiment, with respect to the steering wheel equipped with the air bag apparatus mounted on a vehicle such as an automobile, and particularly with respect to the steering wheel equipped with the air bag apparatus having the horn switch that is closed by pressing a portion of the air bag apparatus 4 to activate the horn, since only the cover body 26 is moved back and forth, instead of moving the entire air bag apparatus 4, the urging force of the coil spring 38 serving as the urging means can be reduced, thereby making it possible to improve the feeling of operation of the horn switch device 22 easily.

Also because the horn switch device 22 is installed on the side wall 26b and the outer peripheral side of the surrounding wall 24b while effectively utilizing the space of the respective spoke 7 of the air bag housing portion 32, instead of mounting at the lower portion of the air bag apparatus body 21 or on the fitting portion of the side wall 26b and the surrounding wall 24b, the air bag apparatus 4 can be smaller in size and the appearance of the steering wheel 1 can be easily improved. For example, the steering wheel 1 as a whole can look compact and neat, while making it easier to steer and to turn on the switches for the horn.

Moreover, since the movable contact 36e of the horn switch device 22 is located on the back surface of the covering portion 26a of the cover body 26 and is directly moved, the member that is required to be present between the operating portion and the switch portion can be minimized, and the feeling of operation can be easily improved. Also it is not necessary to make the resin that makes the cover body 26 too rigid, and a flexible material suitable for the expansion of the air bag 25 can be used thereby making it possible to adjust the expansion characteristics of the air bag 25 easily.

Also because the cover body 26 is guided by the engagement portion between the lock receiving portion 26h of the cover body 26 and the hook 24h of the base plate 24 to move back and forth within a predetermined range, the constitution can be simplified and manufactured easily through a simple assembly process.

The hook 36c of the bracket 35 that supports the movable contact 36e locks on the edge of the notch 26g of the side wall 26b of the cover body 26, thereby holding the cover body 26 on the air bag apparatus 4 when the air bag 25 expands, and restricting deformation of the cover body 26. Accordingly, engagement between the lock receiving portion 26h of the cover body 26 and the hook 24h of the base plate 24 can be maintained firmly. Moreover, since the bracket 35 is located outside the base plate 24 and the cover body 26 that are assembled in a socket and spigot joint configuration, the operations of assembly and in-process inspection can be easily done.

Also because the surrounding wall 24b of the base plate 24 is formed so as to substantially constitute the total height of the air bag housing portion 32 wherein the air bag 25 is folded and housed, the air bag 25 can be easily protected by preventing the cover body 26 that moves back and forth when the horn switch device 22 is pressed to operate and the air bag 25 housed in the air bag housing portion 32 from rubbing each other.

Also because the base plate 24 is formed integrally by die casting of magnesium alloy, the manufacturing cost can be reduced. Namely, the base plate 24 is integrally molded to form the substrate portion 24a, the surrounding wall 24b having a closed shape surrounding the substrate portion 24a, and the fixed contact support portion 31 that supports the fixed contact 31d located on the outer periphery of the surrounding wall 24b. The base plate 24 having a complicated structure can be molded integrally with a predetermined die and the desired wall thickness can be set for any portion, thereby rationalizing and optimizing the structure, thus making it possible to achieve a proper strength while reducing the total weight. Moreover, since the entire body can be formed integrally in a single process, namely can be made in one-shot molding, it is unnecessary to constitute the base plate 24 from a number of separate parts, thereby realizing a structure having fewer or no joints, resulting in a simplified process of manufacturing the base plate 24 and reduced manufacturing cost. Also it becomes possible to use a material that is highly workable in a plastic state, without any tedious joining processes.

The molding method and the material (grade) to be molded are not limited to those described above. In die casting, for example, AM60 or more preferably AM50 magnesium alloy that is more ductile is used but an aluminum alloy such as ADC7 or iron may also be used. In injection molding, thermoplastic resins such as 6—6 nylon, 6 nylon, polyphenylene sulfide (PPS), polysulfone, or these thermoplastic resins reinforced with glass fibers, and thermosetting resins such as phenol resin and unsaturated polyester resin (BMC) may be used.

Moreover, because the wrapping 28 is provided that covers the front side of the air bag 25 that is folded and housed in the air bag housing portion 32, the air bag 25 that is folded and housed can be maintained in the desired shape at the desired position, and the air bag 25 can be easily protected by preventing the cover body 26 that moves back and forth when the horn switch device 22 is pressed to operate and the air bag 25 housed in the air bag housing portion 32 from rubbing each other.

Furthermore, since the side wall 26b of the cover body 26 protrudes downwardly from a back side of the covering portion 26a along the surrounding wall 24b of the base body, the cover body 26 fitted at the surrounding wall 24b can be moved back and forth smoothly whereby making it possible to improve the feeling of operation of the horn switch device 22. Preferably, the side wall 26b of the cover body 26 has at least a partially closed shape whereby not only the cover body 26 can be moved back and forth smoothly and the feeling of operation of the horn switch device 22 can be improved but also the cover body 26 is strengthened.

In the embodiment described above, movement of the cover body 26 is guided in the predetermined vertical direction by the engagement of the lock receiving portion 26h and the hook 24h, in such a condition that the hook 24h of the base plate 24 is hooked onto the lock receiving portion 26h of the cover body 26 and locked. However, one or both of the upward and downward movements when the horn switch device 22 is pressed to operate normally may also be regulated by the engagement of the lock receiving portion 26h and the hook 24h. Alternatively, the distance between the contacts 31d and 36e may also be regulated by means of the horn switch device 22 alone by inserting the hook 24h playably in the lock receiving portion 26h thus making the lock receiving portion a playable insertion portion with regard to the vertical movement, thereby eliminating the hitching between the cover body 26 and the base plate 24 when the horn switch device 22 is pressed to operate, thereby making it possible to improve the feeling of operation of the horn switch device 22.

Figure 6:
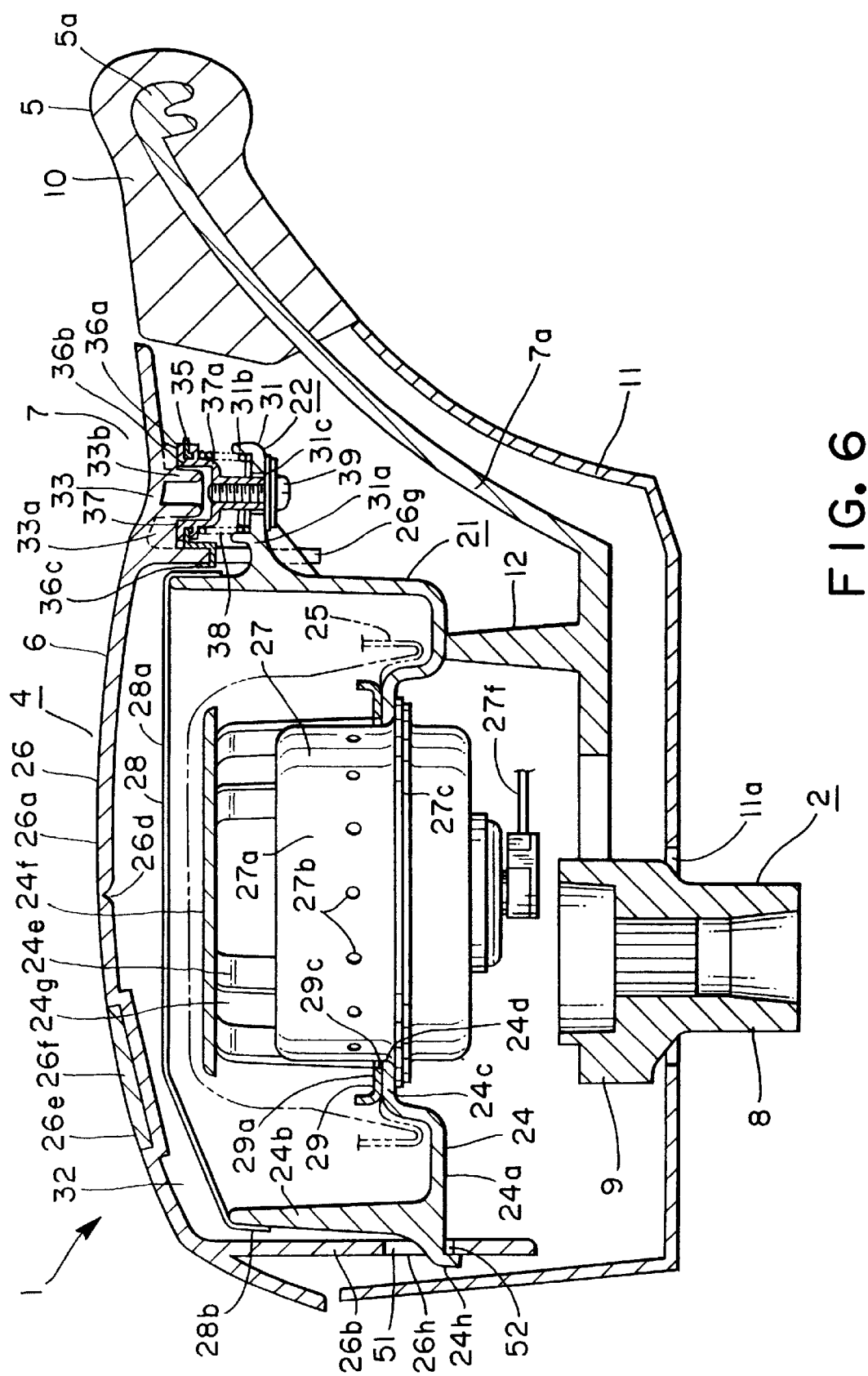
FIG. 6 is a sectional view corresponding to that along line 2—2 in FIG. 1 showing another embodiment of the steering wheel provided with the air bag apparatus of the present invention.

FIG. 6 is a sectional view showing another embodiment of the air bag apparatus and the steering wheel of the present invention. Components parts substantially the same as those of the embodiment shown in FIG. 1 and the related drawings will be denoted with identical reference numerals and duplicate description thereof will be omitted.

In this constitution, the hook 24h is inserted playably in the lock receiving portion 26h. When an operating force is not applied to the cover body 26 that serves as the operating portion, namely when the contacts are opened by the urging force of the coil spring 38 of the horn switch device 22 so that the cover body 26 is positioned at the upper limit, clearance 51 is provided between the upper portion of the hook 24h and the lock receiving portion 26h, while at the same time clearance 52 is secured between the lower portion of the hook 24h and the lock receiving portion 26h. When the cover body 26 is pressed to operate, the hook 24h moves in the lock receiving portion 26h in such a direction that reduces the clearance 51, although both clearances 51, 52 are maintained during normal pressing operation, so that the upper and lower portions of the hook 24h do not make contact with the lock receiving portion 26h.

In such a constitution that does not have the lower clearance 52 when an operating force is not applied to the cover body 26 that serves as the operating portion, a pressure is generated between the contact surfaces of the lock receiving portion 26h and the hook 24h by the urging force of the coil spring 38, and deformation is generated in the structure between the horn switch device 22 and the departed hook 24h. As a consequence, it becomes necessary to cancel the pressure between the contact surfaces when the cover body 26 is pressed downward, and move the horn switch device 22 to close the contact. When the motion of pressing down the cover body 26 is stopped, the cover body 26 is pressed back upward by the urging force of the coil spring 38, while the lock receiving portion 26h and the hook 24h make contact with each other before the horn switch device 22 reaches the open end. The movement of the lock receiving portion 26h and the hook 24h making contact with each other has a subtle effect on the feeling of operation.

When the clearance 52 is secured between the hook 24h and the lock receiving portion 26h, on the other hand, the feeling of operation is determined by only the horn switch device 22, thereby providing a satisfactory feeling of crisp and straightforward operation.

When the air bag apparatus 25 is expanded, a force far greater than that of operating the horn is exerted to the cover body 26. At this time, the clearance 52 between the hook 24h and the lock receiving portion 26h is squeezed beyond the range of the normal operation. Moreover, the lower end or the upper end of the hook 24h makes contact with the lock receiving portion 26h, so that the cover body 26 is firmly supported and the air bag 25 can be expanded smoothly.

In respective embodiments described above, the lock receiving portion in the form of a hole may also be formed in the base plate with a hook formed on the cover body to protrude therefrom, instead of the hook 24h provided to protrude from the base plate 24 and the lock receiving portion 26h provided on the cover body 26. Alternatively, the lock receiving portion and the hook may also be formed on both the base plate and the cover body.

Figure 7:
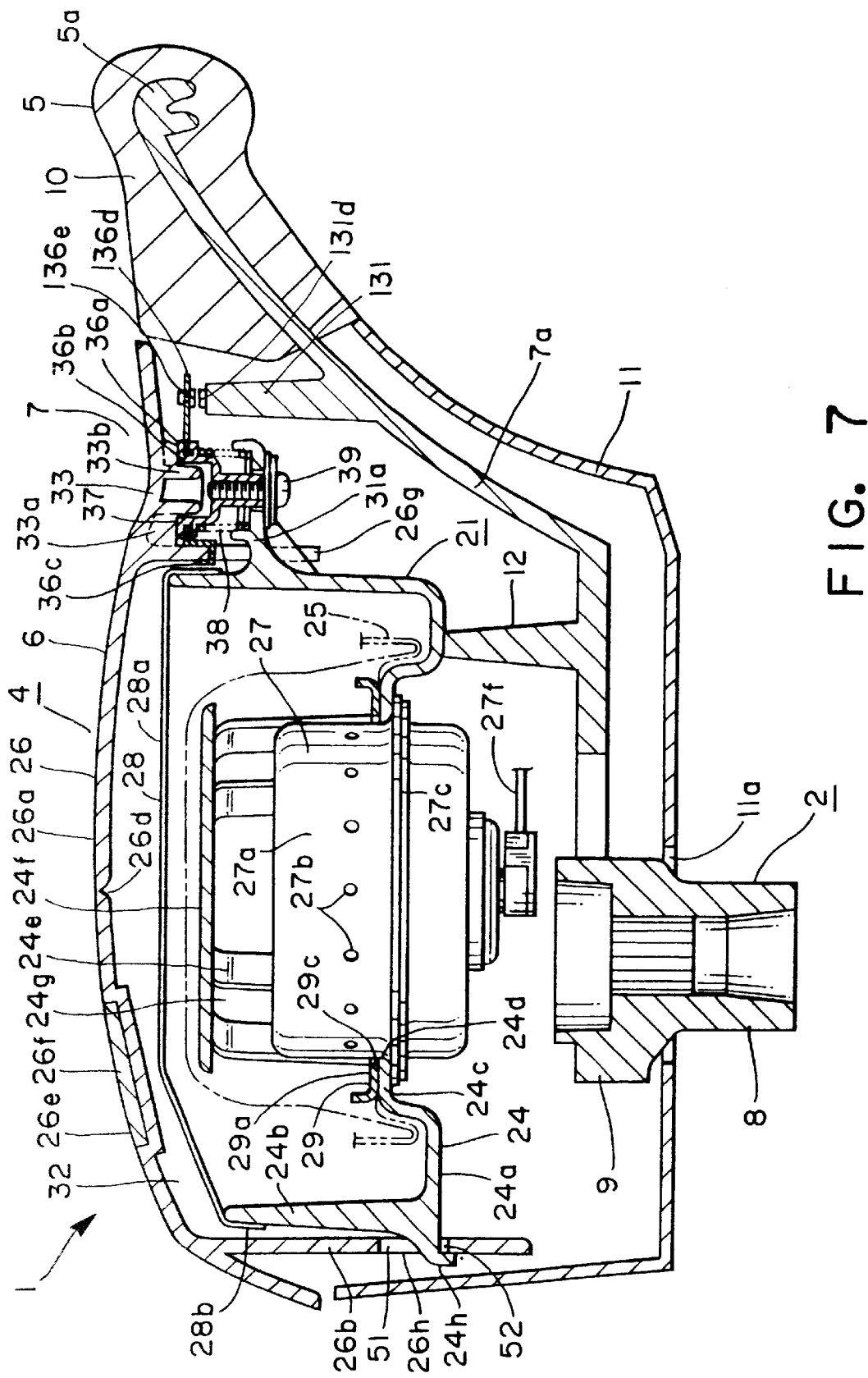
FIG. 7 is a sectional view similar to that of FIG. 6 depicting on alternative embodiment where the fixed contact and the fixed contact support portion are supported on the steering wheel body side.

Although the fixed contact 31d and the fixed contact support portion 31 whereon the fixed contact 31d is mounted are installed on the base plate 24 in the embodiment described above, it may also be supported on the steering wheel body 2 side, for example, on the core metal 7a of the spoke 7. For example, in the constitution as shown in FIG. 6, instead of installing the fixed contact support portion 31 on the base plate 24, a movable contact 136e as a first contact may be installed on an extending portion 136d that is extended outwardly from the plate 36 of the bracket 35, as shown in FIG. 7. A fixed contact support portion 131 in the shape of a pillar is provided integrally to protrude or project upward from the core metal 7a of the spoke 7. A fixed contact 131d as a second contact that is opposed to the movable contact 136e and can make contact with and depart from the movable contact 136e is provided integrally or separately at the tip of the fixed contact support portion 131. With the constitution as shown in FIG. 7, the air bag 4 that has the same function as the constitution as shown in FIG. 6 can be also constituted.

According to the present invention, when the lid of the cover body is pressed against the urging force of the urging means, the first contact is forced via the lid to move and make contact with the second contact, thereby closing the contacts. Since the switching device supports only the cover body, and not the entire air bag apparatus, the urging force of the urging means can be reduced and the feeling of operation of the switching device can be improved. Moreover, since the switching device is operated by pressing directly on the lid, the feeling of operation of the switching device can be improved compared to such a constitution where the entire air bag and the side wall of the cover body are provided between the pressing portion and the switching device. Also because the switching device is located on the outer peripheral side of the side wall of the cover body, construction of the cover body and the base body can be simplified and the manufacturing cost can be reduced and the apparatus can be smaller in size.

Since the surrounding wall of the base body is provided with a height substantially equal to the height of the air bag housing portion enclosing the air bag, the air bag incorporated in the air bag housing portion is protected from the cover body that moves back and forth when the switching device is pressed to operate.

Since the wrapping means wrapping at least a part of the front side of the air bag enclosed in the air bag housing portion is provided, the air bag that is incorporated while being folded up can be maintained in a desired shape and kept stationary at a desired position, while the air bag incorporated in the air bag housing portion can be protected from the cover body that moves back and forth when the switching device is pressed to operate.

Since the surrounding wall of the base body is formed integrally with the base, its constitution is simplified with a reduced number of component parts, so that the assembly operation is also simplified. The manufacturing cost is reduced and the apparatus is also smaller in size.

Since the engagement portion is provided on one of the surrounding wall and the side wall, and the lock receiving portion engaging with and holding the engagement portion movably within a predetermined range in back and forth direction is provided on the other of the surrounding wall and the side wall, its constitution is simplified with a reduced number of component parts, so that the assembly operation is also simplified. The manufacturing cost is reduced and the apparatus is also smaller in size.

Since the lock receiving portion guides the engagement portion freely in such a direction that the contacts touch with and depart from each other in a range of movement caused by normal operation of the switching device, the feeling of operation of the switching device can be improved by restricting the contact between the cover and the base body and regulating the distance between the contacts by means of the switching device alone during operation of the switching device.

The base body having a complicated structure is molded as a single body using a die by forming the base portion, the surrounding wall that is formed to protrude in a closed or substantially closed shape on the front side surrounding the base portion and the support portion that is provided on the outer peripheral portion of the surrounding wall to oppose the back surface of the lid and supports the second contact. Wall thicknesses required for any region can be arbitrarily set, thereby rationalizing and optimizing the structure, thus making it possible to achieve a proper strength while reducing the total weight. Moreover, the base body can be formed integrally in a single process thus making it unnecessary to construct the base body from a number of separate parts, thereby realizing a structure having fewer or no joints, resulting in a simplified process of manufacturing the base body and reduced manufacturing cost. Also it is made possible to use a material that is highly workable in a plastic state, without any tedious joining processes.

Since the bracket that supports the first contact and supports at least the outer peripheral side of the side wall is provided, the side wall of the cover body can be restricted from deforming without making its constitution complex. Since the bracket is located on the outer peripheral side of the surrounding wall and the side wall, operations of assembly and inspection are made easier.

With the switching device having a good feeling of operation installed on the spoke, the air bag apparatus is down-sized, and it is possible to improve the appearance of the air bag apparatus on the steering wheel.

What is claimed is:

1. An air bag apparatus comprising:

an air bag;

an inflator supplying a gas to said air bag;

a base body having a base portion, said base portion mounting said air bag and said inflator, said base portion being attached to a steering wheel mounting member, the base body further having a peripheral wall portion having at least a partially closed shape and protruding along a periphery of the base portion toward a front direction;

a cover body having a lid portion covering a front side of the peripheral wall portion and having a side wall protruding downwardly from a back side of said lid portion along said peripheral wall portion of said base body;

means for wrapping at least a part of the front side of the peripheral wall portion and the air bag enclosed in an air bag housing portion, wherein the wrapping means maintains a desired shape of the air bag at a desired position relative to the cover body; and a switching device located on an outer peripheral side of said side wall of said cover body, the switching device including an urging means for urging said cover body away from the front side of the peripheral wall portion, a first contact supported on the back side of said lid portion, and a second contact opposed to the first contact and being supported by one of said base body and said mounting member, wherein a lock receiving portion is guided by an engagement member freely such that the contacts can make contact with and depart from each other in a range of movement caused by an operation of the switching device, the lock receiving portion and the engagement member movably connecting the side wall to the peripheral wall portion, wherein the peripheral wall portion of the base body is formed integrally with the base portion, and wherein the base body is an integrally formed body and includes the base portion, the peripheral wall portion protruding from the base portion, and a support portion that is provided on an outer peripheral side of the peripheral wall portion to oppose the back side of the lid portion and support the second contact.

2. An air bag apparatus according to claim 1, wherein said side wall of said cover body has at least a partially closed shape.

3. An air bag apparatus according to claim 1, wherein the height of the peripheral wall portion of the base body is substantially equal to the height of the air bag housing portion enclosing the air bag.

4. An air bag apparatus according to claim 1, wherein the engagement member is provided on one of the peripheral wall portion and the side wall, and the lock receiving portion engaging with and held by said engagement member movably within a predetermined range in back and forth directions is provided on the other of the peripheral wall portion and the side wall.

5. An air bag apparatus according to claim 1, wherein the switching device has a bracket that holds the first contact and supports at least the outer peripheral side of the side wall.

6. An air bag apparatus comprising:

an air bag;

an inflator supplying a gas to said air bag;

a base body having a base portion, said base portion mounting said air bag and said inflator, said base portion being attached to a steering wheel mounting member, the base body further having a peripheral wall portion having at least a partially closed shape and protruding along a periphery of the base portion toward a front direction;

a cover body having a lid portion covering a front side of the peripheral wall portion and having a side wall protruding downwardly from a back side of said lid portion along said peripheral wall portion of said base body;

means for wrapping at least a part of the front side of the peripheral wall portion and the air bag enclosed in an air bag housing portion, wherein the wrapping means maintains a desired shape of the air bag at a desired position relative to the cover body; and a switching device located on an outer peripheral side of said side wall of said cover body, the switching device including an urging means for urging said cover body away from the front side of the peripheral wall portion, a first contact supported on the back side of said lid portion, and a second contact opposed to the first contact and being supported by one of said base body and said mounting member, wherein a lock receiving portion is guided by an engagement member freely such that the contacts can make contact with and depart from each other in a range of movement caused by an operation of the switching device, the lock receiving portion and the engagement member movably connecting the side wall to the peripheral wall portion, and wherein the switching device has a bracket that holds the first contact and supports at least the outer peripheral side of the side wall.

7. An air bag apparatus according to claim 6, wherein said side wall of said cover body has at least a partially closed shape.

8. An air bag apparatus according to claim 6, wherein the height of the peripheral wall portion of the base body is substantially equal to the height of the air bag housing portion enclosing the air bag.

9. An air bag apparatus according to claim 6, wherein the peripheral wall portion of the base body is formed integrally with the base portion.

10. An air bag apparatus according to claim 9, wherein the base body is an integrally formed body and includes the base portion, the peripheral wall portion protruding from the base portion, and a support portion that is provided on an outer peripheral side of the peripheral wall portion to oppose the back side of the lid portion and support the second contact.

11. An air bag apparatus according to claim 6, wherein the engagement member is provided on one of the peripheral wall portion and the side wall, and the lock receiving portion engaging with and held by said engagement member movably within a predetermined range in back and forth directions is provided on the other of the peripheral wall portion and the side wall.

12. An air bag apparatus comprising:

an air bag;

an inflator supplying a gas to said air bag;

a base body having a base portion, said base portion mounting said air bag and said inflator, said base portion being attached to a steering wheel mounting member, the base body further having a peripheral wall portion having at least a partially closed shape and protruding along a periphery of the base portion toward a front direction;

a cover body having a lid portion covering a front side of the peripheral wall portion and having a side wall protruding downwardly from a back side of said lid portion along said peripheral wall portion of said base body;

an engagement member is provided on one of the peripheral wall portion and the side wall, and a lock receiving portion engaging with and held by said engagement member movably within a predetermined range in back and forth directions is provided on the other of the peripheral wall portion and the side wall; and a switching device located on an outer peripheral side of said side wall of said cover body, the switching device including an urging means for urging said cover body away from the front side of the peripheral wall portion, a first contact supported on the back side of said lid portion, and a second contact opposed to the first contact and being supported by one of said base body and said mounting member, wherein the lock receiving portion is guided by the engagement member freely such that the contacts can make contact with and depart from each other in a range of movement caused by an operation of the switching device, wherein the peripheral wall portion of the base body is formed integrally with the base portion, and wherein the base body is an integrally formed body and includes the base portion, the peripheral wall portion protruding from the base portion, and a support portion that is provided on an outer peripheral side of the peripheral wall portion to oppose the back side of the lid portion and support the second contact.

13. An air bag apparatus according to claim 12, wherein said side wall of said cover body has at least a partially closed shape.

14. An air bag apparatus according to claim 12, wherein the height of the peripheral wall portion of the base body is substantially equal to the height of an air bag housing portion enclosing the air bag.

15. An air bag apparatus according to claim 12, further comprising:

means for wrapping at least a part of the front side of the peripheral wall portion and the air bag enclosed in an air bag housing portion, wherein the wrapping means maintains a desired shape of the air bag at a desired position relative to the cover body.

16. An air bag apparatus according to claim 12, wherein the switching device has a bracket that holds the first contact and supports at least the outer peripheral side of the side wall.

17. An air bag apparatus comprising:

an air bag;

an inflator supplying a gas to said air bag;

a base body having a base portion, said base portion mounting said air bag and said inflator, said base portion being attached to a steering wheel mounting member, the base body further having a peripheral wall portion having at least a partially closed shape and protruding along a periphery of the base portion toward a front direction;

a cover body having a lid portion covering a front side of the peripheral wall portion and having a side wall protruding downwardly from a back side of said lid portion along said peripheral wall portion of said base body;

an engagement member is provided on one of the peripheral wall portion and the side wall, and a lock receiving portion engaging with and held by said engagement member movably within a predetermined range in back and forth directions is provided on the other of the peripheral wall portion and the side wall; and a switching device located on an outer peripheral side of said side wall of said cover body, the switching device including an urging means for urging said cover body away from the front side of the peripheral wall portion, a first contact supported on the back side of said lid portion, and a second contact opposed to the first contact and being supported by one of said base body and said mounting member, wherein the lock receiving portion is guided by the engagement member freely such that the contacts can make contact with and depart from each other in a range of movement caused by an operation of the switching device, and wherein the switching device has a bracket that holds the first contact and supports at least the outer peripheral side of the side wall.

18. An air bag apparatus according to claim 17, wherein said side wall of said cover body has at least a partially closed shape.

19. An air bag apparatus according to claim 17, wherein the height of the peripheral wall portion of the base body is substantially equal to the height of an air bag housing portion enclosing the air bag.

20. An air bag apparatus according to claim 17, further comprising:

means for wrapping at least a part of the front side of the peripheral wall portion and the air bag enclosed in an air bag housing portion, wherein the wrapping means maintains a desired shape of the air bag at a desired position relative to the cover body.

21. An air bag apparatus according to claim 17, wherein the peripheral wall portion of the base body is formed integrally with the base portion.

22. An air bag apparatus according to claim 21, wherein the base body is an integrally formed body and includes the base portion, the peripheral wall portion protruding from the base portion, and a support portion that is provided on an outer peripheral side of the peripheral wall portion to oppose the back side of the lid portion and support the second contact.

* * * * *

UNITED STATES PATENT AND TRADEMARK OFFICE
CERTIFICATE OF CORRECTION

PATENT NO. : 6,719,323 B2
DATED : April 13, 2004
INVENTOR(S) : Takeshi Kai et al.

It is certified that error appears in the above-identified patent and that said Letters Patent is hereby corrected as shown below:

Title page,
Item [75], Inventors, change "Takeshi Kai, Wako (JP)" with -- Takeshi Kai, Saitama (JP) --; change "Morimasa Asai, Fuji (JP)" with -- Morimasa Asai, Shizuoka (JP) --; change "Masami Tonooka, Fuji (JP)" with -- Masami Tonooka, Shizuoka (JP) --; and change "Katsuhiro Tokita, Fuji (JP)" with -- Katsuhiro Tokita, Shizuoka (JP) --.

Signed and Sealed this

Third Day of August, 2004

JON W. DUDAS
*Acting Direcwithr of the United States Patent and Trademark*